United States Patent [19]

Arbouw

[11] Patent Number: 4,649,770

[45] Date of Patent: Mar. 17, 1987

[54] PIVOTING MECHANISM HAVING TWO END POSITIONS

[75] Inventor: Jac Arbouw, Monster, Netherlands

[73] Assignee: N.V. Optische Industrie "De Oude Delft", Netherlands

[21] Appl. No.: 726,817

[22] Filed: Apr. 25, 1985

[30] Foreign Application Priority Data

Apr. 26, 1984 [NL] Netherlands ................. 8401338

[51] Int. Cl.$^4$ ............................................. G05G 5/06
[52] U.S. Cl. ............................................. 74/529; 74/540
[58] Field of Search .............. 74/527, 540, 541, 542, 74/529

[56] References Cited

U.S. PATENT DOCUMENTS

| | | | |
|---|---|---|---|
| 2,867,133 | 1/1959 | Ewing | 74/529 |
| 3,379,075 | 4/1968 | Harrison | 74/527 |
| 3,786,693 | 1/1974 | Keipert | 74/527 |
| 4,036,078 | 7/1977 | Muehling | 74/529 |
| 4,391,159 | 7/1983 | Sellmeyer | 74/540 X |
| 4,538,478 | 9/1985 | Sato et al. | 74/540 X |

Primary Examiner—Albert J. Makay
Assistant Examiner—Steven E. Warner
Attorney, Agent, or Firm—Louis E. Marn

[57] ABSTRACT

A pivoting mechanism having two lockable end positions, and comprising a stationary basic body having two first stop surfaces each defining an end position in cooperation each with a different one of first counter stop surfaces on a pivotable basic body drivable by means of a pivot shaft journalled in the stationary basic body. One of the basic bodies is further provided with two second stop surfaces directed oppositely to the first stop surfaces and each arranged, for locking one of the end positions, to cooperate with one of two second counter stop surfaces on a pawl member mounted for movement on the other basic body. The movement of the pawl member is controlled by a cam on a control body secured to the pivot shaft for rotation relative to the pivotable basic body.

6 Claims, 3 Drawing Figures

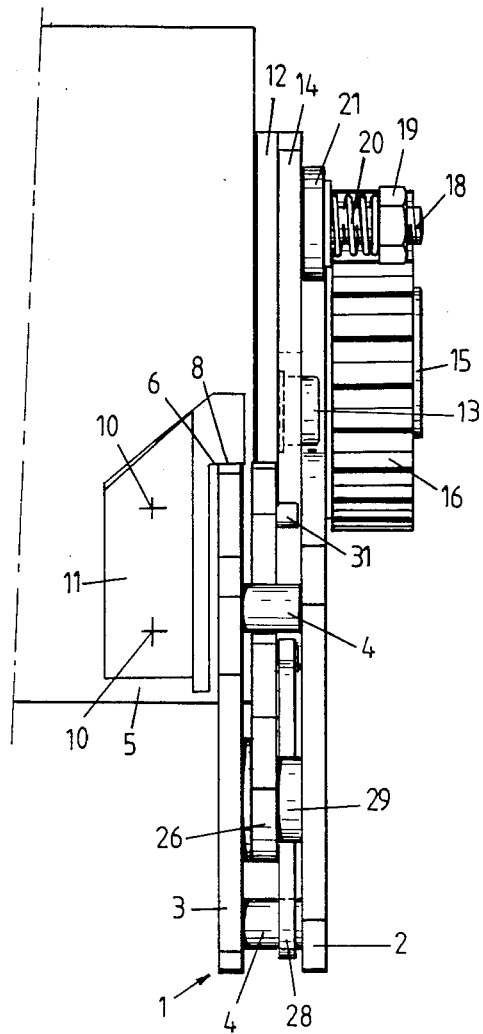

PIVOTING MECHANISM HAVING TWO END POSITIONS

This invention relates to a pivoting mechanism having two end positions and comprising a stationary basic body having two first stop surfaces defining the two end positions, said first stop surfaces being arranged alternately to cooperate with one of two first counter stop surfaces on a pivotable basic body that is drivable by means of a pivot shaft journalled in the stationary basic body.

Such a well-known pivoting mechanism permits the pivotable basic body to be rotated, in a relatively simple manner, through an accurately indexable and possibly adjustable angle relatively to the stationary basic body by turning the pivotable basic body from its first end position into its second end position and back.

Problems may present themselves if the two end positions must be accurately maintained while the stationary and the pivotable bodies are subjected to vibrations, shocks and the like. In that case the end positions should be fixed by locking means, and this may be accompanied by particular problems if the two bodies are mounted in the interior of a closed housing of limited size, which for example only accommodates a single rotary drive for the pivot shaft.

It is an object of the present invention to improve a pivoting mechanism of the kind defined in the opening paragraph in such a manner that it can be brought to both its end positions with a single drive, and is lockable in each of said two positions in a shock and vibration resistant manner, and unlockable, whereby the space occupied can be reduced to a minimum.

This is achieved, according to the present invention, by providing one of said basic bodies with two second stop surfaces directed oppositely to the first, each arranged to cooperate, for fixing one of the end positions, with one of two second counter stop surfaces on a pawl member mounted on the other basic member for movement relative thereto, which movement is controlled by a cam provided on a control body mounted on said pivot shaft and rotatable relatively to said pivotable basic body through an angle sufficient to unlock said pawl member.

By virtue of these features, the pivoting mechanism can be fixed in both end positions by means of the second stop surfaces and counter stop surfaces, which is accomplished by causing the pawl member to be released by the cam on the control body whereby on further rotation of the pivot shaft the first stop surface contacts the first counter stop service thereby stopping the pivotable basic body and the second stop surface starts cooperating with the second counter stop surface, whereby the pivotable basic body is immovably fixed in its end position so as to be locked against vibrations and shocks. The pivoting mechanism is brought into its other end position by driving the pivot shaft in the opposite direction, whereby first the control body is moved through a small angle relatively to the pivotable basic body, thereby forcing the pawl member out of its locking position, whereafter the pivotable body is free to turn into the other end position, together with the control body, where locking again takes place as described above.

The desired cooperation between the pivotable basic body and the control body can be realized in a simple, but extremely effective manner, which specifically occupies little space, if, in accordance with a further embodiment of the present invention, the control body is a plate in surface-to-surface contact with a plate surface of said pivotable basic body, the two bodies being coupled by a pin member secured to one of the two bodies to extend at right angles to the contacting surfaces at least into a slot provided in the other body.

In order to render this cooperation optimally resistant to vibration and shock, it is preferable, in accordance with a further embodiment of the invention, that the pin member is a bolt extending through the slot in said other body and carrying a nut bearing through a spring on said other body. These features effectively prevent the control body and pivotable basic body from being moved relatively to each other otherwise than by driving the pivot shaft, no matter in what position the elements are placed relatively to the direction of gravity.

Fixing can be realized in a relatively simple, but reliable manner, and by means which occupy little place, if, in accordance with a further embodiment of the invention, the pawl member is a pivoting arm mounted on the stationary basic body and spring-urged into the direction of the cam on the control body, said pivoting arm having a free end carrying the two counter stop surfaces, and including a pin arranged to cooperate with the cam on said control body.

In order to realize that, in a relatively tolerance-insensitive manner, even if slight wear and deformation occur, the mechanism is at all events fixed in the two end positions free from play, it is preferable, in accordance with a further embodiment of the present invention, that a second counter stop surface of the pawl member when engaging the associated second stop surface encloses a small angle with said second stop surface.

A particularly flat pivoting mechanism according to the present invention, which occupies a minimum of space, is obtained if, in accordance with a further embodiment of the invention, the stationary basic body comprises a pair of plates spaced a short distance apart by connecting elements, the space between the plates accommodating a plate-shaped control body, a plate-shaped spring-urged pawl member, and a plate forming part of the pivotable basic body, the arrangement being such that the plate-shaped pawl member and the plate forming part of the basic body, which is provided with the second stop surfaces, are located substantially in co-planar relationship, and so do the plate-shaped control body and a spring acting on the pawl member. There is thus obtained a pivoting mechanism which can be fixed in, and unlocked from, both end positions by means of a single, drivable pivot shaft, and which has a thickness equal to four superimposed plates, when for example, a thickness of about 2.5 mm for each plate results in a construction which, as regards robustness, satisfies severe requirements.

One embodiment of the pivoting mechanism according to the present invention will now be described and elucidated, by way of example, with reference to the accompanying drawings. In said drawings:

FIG. 3 shows the pivoting mechanism of FIG. 2 in side-elevational view.

Figure 1:
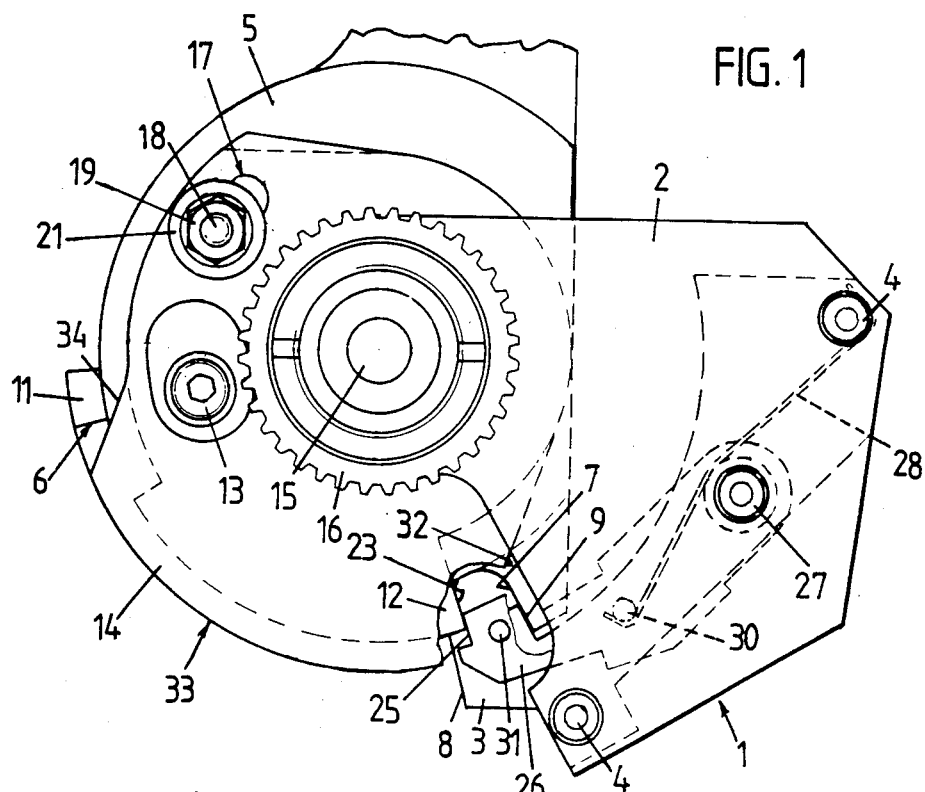
FIG. 1 illustrates the pivoting mechanism in bottom view in its one end position.

The pivoting mechanism illustrated in the accompanying drawings comprises a stationary basic body 1, which for example is mounted in the interior of a closed housing, not shown, and is composed of a first plate 2 and a second plate 3 coupled together by pins 4.

Furthermore, the pivoting mechanism includes a pivotable basic body 5 having first counter stop surfaces 6 and 7 arranged to cooperate with first stop surfaces 8 and 9, formed on the second plate 3 of the stationary basic body 1. The first counter stop surface 6 is provided on a stop surface member 11, which is adjustable relatively to the pivotable basic body 5 by means of bolts 10. A basic body plate 12 is fixedly connected to the pivotable basic body 5 by means of a socket head screw 13. Lying on plate 12 is a control plate 14, which is fixedly connected to a pivot shaft 15, which by means of a gear 16 is drivable in a manner not shown. Control plate 14 has a slot 17, through which extends a bolt 18 secured in plate 12. A nut 19 screwed upon bolt 18 bears on control plate 14 through a helical spring 20 and a washer 21, owing to which it is resiliently pressed into contact with plate 12. Owing to this construction, when the mechanism is driven by means of pivot shaft 15, control plate 14 is rotatable relatively to the basic body plate 12 through the length of slot 17. Upon further rotation, if permitted by the first stop surfaces 8 and 9, control plate 14 will rotate along with plate 12 and accordingly along with the pivotable basic body 5.

Plate 12 further comprises two stop surfaces 22 and 23, arranged to cooperate with two counter stop surfaces 24 and 25 on a pawl member 26, which via a pivot shaft 27 is connected to plates 2 and 3 of the stationary basic body 1, and by means of a leaf spring 28, which acts on pin 4, a sleeve 29 on shaft 27, and a pin 30 on pawl member 26, is urged into the direction of plate 12, which is co-planar with pawl member 26. Pawl member 26 further comprises a laterally projecting pin 31, arranged to cooperate with the outer circumference of control plate 14, which outer circumference is formed as a cam for pawl member 26, for which purpose it includes a first sloping cam portion 32, a circular cam portion 33 and a second sloping cam portion 34.

Figure 2:
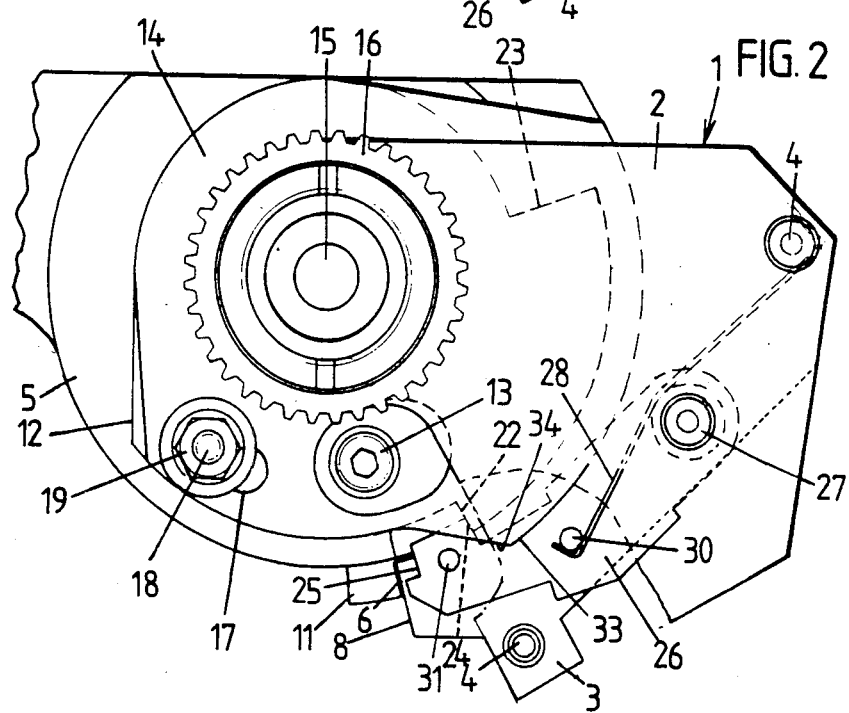
FIG. 2 shows the pivoting mechanism of FIG. 1 in its other end position.

In order to bring the pivoting mechanism from the position shown in FIG. 1 to that shown in FIG. 2, the pivot shaft 15 is turned counter-clockwise, as viewed in FIG. 1, by means of gear 16 and drive means not shown. In the first instance, this will cause control plate 14 to rotate, with the pivotable basic body 5, which is locked in its position by the cooperating surfaces 7, 9 and 23, 25, being retained in position, and the displacement of the control plate being rendered possible by slot 17. During the rotation of control plate 14, the sloping cam portion 32 thereof will contact pin 31 of pawl member 26, whereafter further rotation of the control plate 14 will cause pawl member 26 to be lifted from its locking position through pin 31. The pivotable basic body 5 is then free to rotate, which is effected when bolt 18 strikes the end of slot 17 in the rotating control plate 14. Upon further rotation of control plate 14 and the pivotable basic body 5, pin 31 will first travel over the circular cam portion 33, then to arrive at the second sloping cam portion 34. This will release pawl member 26 to pivot under the influence of leaf spring 28. This pivoting movement, however, is initially prevented by the presence of plate 12 until the second stop surface 22 passes pawl member 26. Pawl member 26 then pivots further under the influence of spring 28, which causes the second counter stop surface 24 of pawl member 26 to engage the second stop surface 22 of plate 12. At the same time, the pivotable basic body 5 is stopped in its rotation by the first counter stop surface 6 striking the first stop surface 8 of the second plate 3 of the stationary basic body 1. The pivotable basic body 5 is now fixed in its position by the cooperating stop surfaces 22 and 24, on the one hand, and the cooperating stop surfaces 6 and 8, on the other.

The pivoting mechanism is returned to the position illustrated in FIG. 1 by driving pivot shaft 15 clockwise, whereby pawl member 26 is lifted as a result of the cooperation of the second sloping camming portion 34 with pin 31 and the first sloping camming portion 32 will cause pawl member 26 to arrive in its fixing position (FIG. 1) owing to the continued rotation of control plate 14 after the pivotable basic body 5 has stopped when surfaces 7 and 9 contact each other.

Naturally, many modifications and variants are possible without departing from the scope of the invention. Thus, for example, it is preferable that the surfaces 22 and 23 and/or the cooperating surfaces 24 and 25 should not be directed truly radially, which will ensure that there will always be a fixation free from play with a relatively tolerance-insensitive construction. Furthermore, the outer circumferences of the various plates can be modified in many ways without this affecting the essential operation of the pivoting mechanism. It is also possible for the pivot shaft to be arranged to be hand-operable.

What I claim:

1. A pivoting mechanism having two end positions and comprising a stationary basic body having two first stop surfaces defining two end positions, said first stop surfaces being arranged alternately to cooperate with one of two first counter stop surfaces on a pivotable basic body drivable by a pivot shaft journalled in said stationary basic body, characterized by a pawl member having two second counter stop surfaces and mounted on one of said basic bodies for relative movement thereto, said other basic body being provided with two second stop surfaces directed oppositely to said first stop surfaces, each of said stop surfaces arranged to cooperate for determining one of said end positions with one of said two second counter stop surfaces of said pawl member, said relative movement of said pawl member to said basic member being controlled by a cam provided on a control body mounted on said pivot shaft and rotatable relative to said pivotable basic body through an angle sufficient to unlock said pawl member.

2. The pivoting mechanism according to claim 1, characterized in that said control body is a plate in surface-to-surface contact with a plate surface of said pivotable basic body, said control and pivotable bodies being coupled by a pin member secured to one of said bodies to extend at right angles to said contacting surfaces into a slot provided in the other body.

3. The pivoting mechanism according to claim 2, characterized in that said pin member is a bolt extending through said slot in said other body and carrying a nut having a spring on said other body.

4. The pivoting mechanism according to claim 3, characterized in that said pawl member is a pivoting arm mounted on the stationary basic body and spring-urged into a direction of said cam on said control body, said pivoting arm having a free end carrying said two counter stop surfaces and including a pin arranged to cooperate with said cam on said control body.

5. The pivoting mechanism according to claim 4, characterized in that a second counter stop surface of said pawl member when engaging an associated second stop surface encloses a small angle with said second stop surface.

6. The pivoting mechanism according to claim 5, characterized in that said stationary basic body comprises a pair of plates spaced a short distance apart by connecting elements, a space between said plates accommodating a plate-shaped control body, a plate-shaped spring-urged pawl member, and a plate forming part of said pivotable basic body whereby said plate-shaped pawl member and said plate forming part of said basic body provided with said second stop surfaces are located substantially in co-planar relationship as are said plate-shaped control body and a spring acting on said pawl member.

* * * * *